Aug. 9, 1966 A. E. BROWN ETAL 3,265,027
PROPULSOR
Filed March 12, 1965 3 Sheets-Sheet 2
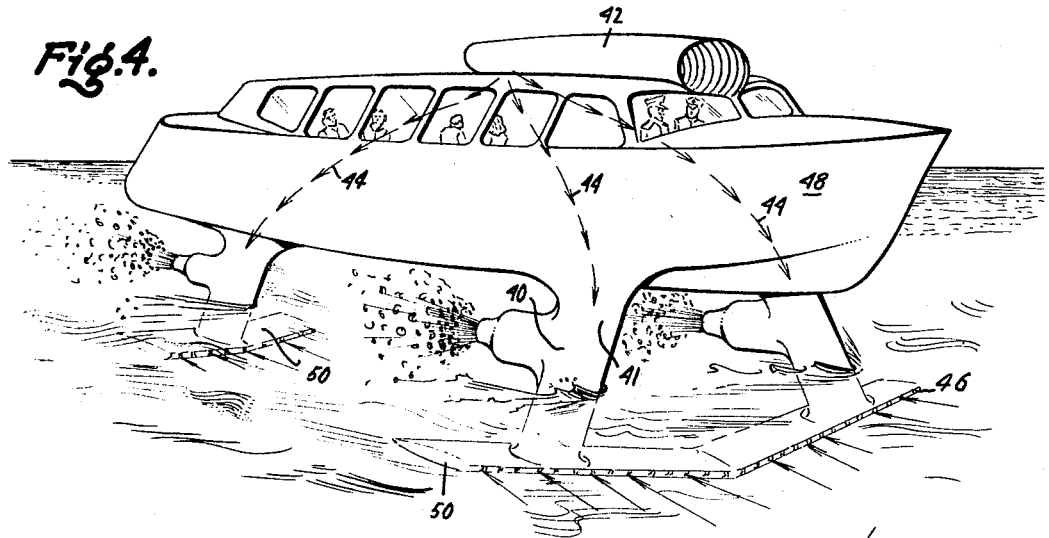
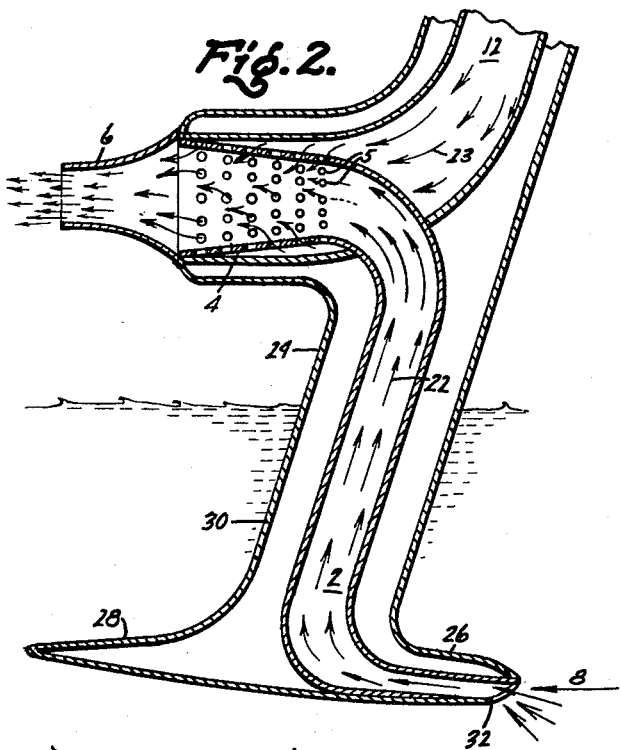
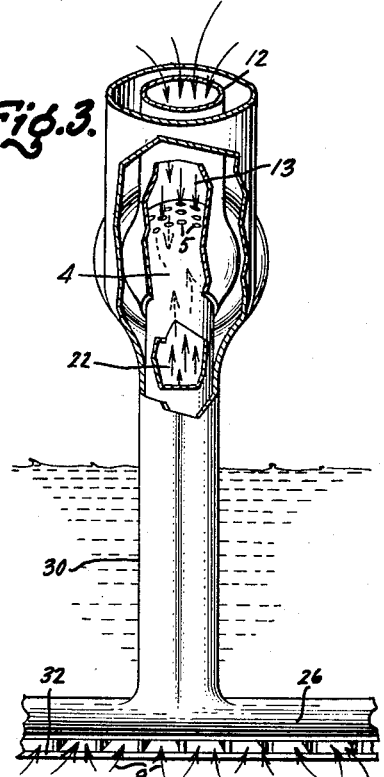
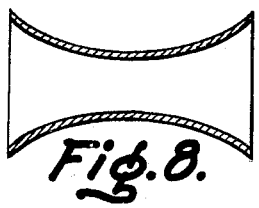
Inventors
Arthur E. Brown
Hansjoerg Stern
by Paul G. Frank
Their Attorney Aug. 9, 1966  A. E. BROWN ETAL  3,265,027
PROPULSOR Filed March 12, 1965  3 Sheets-Sheet 3

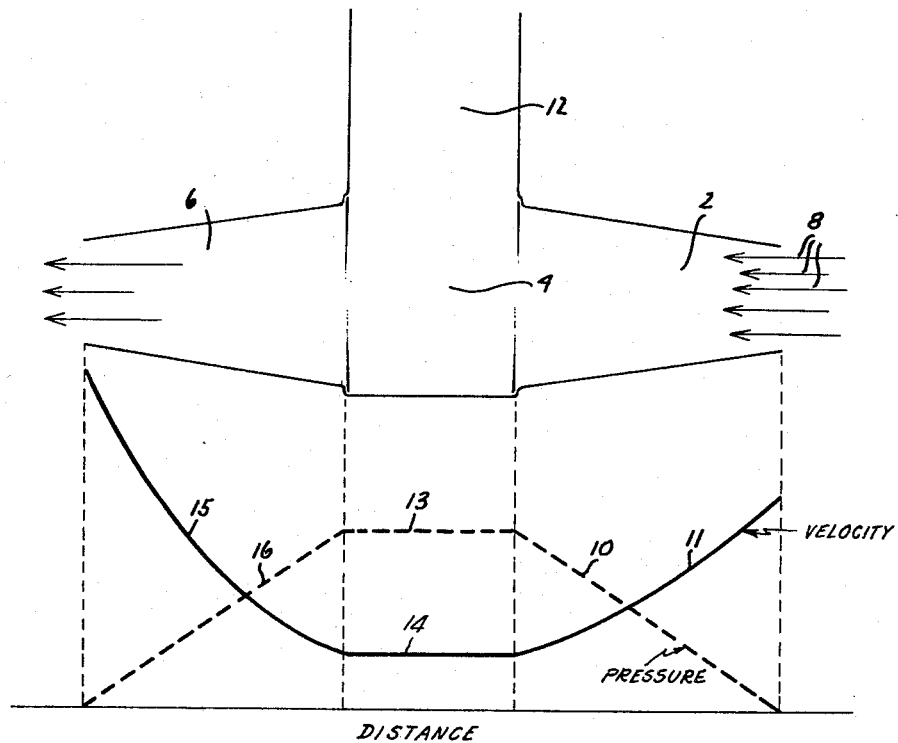

Inventors
Arthur E. Brown
Hansjoerg Stern
by Paul A. Frank
Their Attorney

United States Patent Office 3,265,027
Patented August 9, 1966

3,265,027
PROPULSOR
Arthur E. Brown, Corning, and Hansjoerg Stern, Scotia, N.Y., assignors to General Electric Company, a corporation of New York
Filed Mar. 12, 1965, Ser. No. 439,376
6 Claims. (Cl. 114—66.5)

Our invention relates to propulsors and more particularly to a high efficiency propulsor employing a two-phase nozzle to generate thrust.

With the rapid advances in water travel, a propulsion means is needed that combines high thrust and high efficiency operation over a full range of velocities with operation where no moving parts are present. Conventional propulsion drives rely on moving parts, such as transmissions, propellers, and pump jets and are thus plagued with their inherently more troublesome operation; operation prone to a higher probability of failure. With moving parts, high efficiency with significantly high thrust is unlikely when operation is desired at high velocities. Moreover, at these speeds the effects of cavitation makes failure much more likely.

Ship propulsion drives have been proposed which employ no moving parts, operating by jet action, but their efficiency has been extremely low, and therefore development substantially limited. One such drive employs a chamber wherein exhaust gases and water are mixed at a pressure which is essentially that of the surrounding water; the mixture is then exhausted via a diverging nozzle in an attempt to generate substantial thrust by having gas push water out. Actually, the velocity of the mixture is not substantial enough to impart sufficient thrust for effective propulsion. Moreover, efficiency (the ratio of gas horsepower to the thrust received) is extremely low. In this device no attempt is made to increase the pressure of the water entering the mixing chamber, which pressure would generate force capable of creating any large thrust. The diverging exhaust nozzle employed does not increase thrust, but in fact tends to decrease it. There appears to be a desire to transfer energy from the gas to the water by having gas push the water out rather than conserve energy by having both the gas and water join in producing the required thrust. Thus, even though the device has no moving parts it lacks the requisite thrust and especially the efficiency which would make it desirable. Another ship propulsion device known in the prior art attempts to create a significant thrust by increasing the velocity of the water entering the mixing chamber and then using gas to further propel the water through a diverging exhaust nozzle. This device also is ineffectual since by increasing the velocity of the entering water the pressure inside the mixing chamber is less than the ambient water pressure so that a complete lack of substantial pressure exists with which to impart any significant thrust. A drive using gas alone has been attempted but the efficiency is extremely low and the amount of gas needed to generate significant thrust is great, thus making the device particularly undesirable. Known devices thus lack the ability to produce a significant thrust at high efficiency. Lacking, particularly, is the concept of producing a pressure head in the mixing chamber, which pressure is then converted to a significant velocity head by exhausting both water and gas together as a single medium to generate thrust. The need then arises for a propulsor having no moving parts that develops a significantly high thrust while operating at high efficiency. It would also be advantageous if the propulsor could impart a thrust both when operating completely submerged in water and when operating partially in water and partially in air.

Our invention envisions a propulsor operating without moving parts wherein a high pressure mixture of hot exhaust gas and cold water is discharged through a two-phase converging nozzle to generate a significantly high thrust at high operating efficiency.

The chief object of our invention is the provision of a highly efficient vehicle propulsor which generates a significantly large thrust.

Another object of our invention is the provision of a propulsor that employs a high pressure mixture of hot exhaust gas and cold water to generate a large thrust.

Another object of our invention is the provision of a propulsor for water vehicles having a two-phase exhaust nozzle.

A further object of our invention is the provision of a propulsion drive for hydrofoil ships which operates from start through high speed operation of the ship.

These and other objects of our invention will be more readily perceived from the description which follows.

In carrying out the objects of our invention, we provide a high efficient ship propulsor having no moving parts wherein cold inlet water is pressurized and mixed in a mixing chamber with hot high pressure exhaust gas without any significant kinetic energy transfer therebetween. The gas and water mixture is ejected through a two-phase converging nozzle to transform the high pressure to high velocity through an energy transfer and thereby generate high momentum and thus a significantly high thrust to propel the ship.

The attached drawings illustrate preferred embodiments of our invention in which:

FIGURE 1 is a schematic diagram and graph of the propulsor of our invention;

FIGURE 2 is a cross-sectional view of the propulsor of our invention;

FIGURE 3 is a cross-sectional side view of the propulsor of FIGURE 2;

FIGURE 4 is a view of our propulsor being used to drive a hydrofoil ship;

FIGURE 8 is a view of a converging-diverging nozzle for operation of our propulsor at high speeds.

Figure 5:
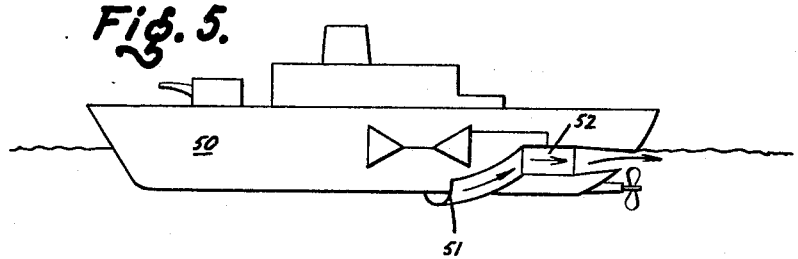
FIGURE 5 is a side view of our propulsor driving a conventional ship.

In FIGURE 1, there is shown a schematic diagram of the propulsor, including inlet diffuser 2, mixing chamber 4 and exhaust nozzle 6, embodying our invention. The schematic of FIGURE 1 is shown for purposes of simplified illustration whereas FIGURE 2 is more illustrative of the actual embodiment of our propulsor. The same numbers are used for equivalent parts in FIGURES 1 and 2 to simplify correlation between the two figures. Beginning with FIGURE 1, cold water, as indicated by arrows 8, which is at ambient pressure and high velocity, enters diffuser 2 wherein, as illustrated by the graph of FIGURE 1 which plots velocity and pressure vs. distance, the pressure is substantially increased (line 10) while the velocity is reduced (line 11). This high pressure, low velocity cold inlet water is then mixed in mixing chamber 4 with high pressure, hot engine exhaust gas entering therein by means of gas inlet 12; thus a mixing of the cold water and the hot exhaust gas takes place under high pressure, low velocity conditions so that energy exchange between the two phases is kept at a bare minimum and thereby the proper nozzle energy relation is maintained in the gas-water mixture. During this mixing operation, whereby bubbles of hot high pressure gas enter the pressurized water, there is substantially no energy transfer between the gas and liquid so that both the pressure and velocity of the mixture remain constant, as indicated by lines 13 and 14, respectively, of the graph of FIGURE 1. The velocity of the mixing process is maintained at low levels to avoid loss of the kinetic or pressure energy of the gas. The water-gas mixture upon leaving mixing chamber 4 travels rapidly through converging nozzle 6 to avoid any loss in thermal energy of the gas to the water by heat transfer. In nozzle 6, the bubbles of gas entrained within the water in the mixing process expand as this mixture passes through nozzle 6. Expansion of the gas bubbles causes the gas-water mixture to increase in volume to thereby convert the high pressure head existing in mixing chamber 4 to a high velocity head as the mixture exits from converging nozzle 6. As shown by line 16 of the graph, the high pressure produced by diffuser 2 has dropped to ambient conditions to thereby increase the velocity (line 15) to a substantial value; a value greater than the input velocity 11, to cause a net momentum change and thus impart substantial propulsive thrust.

It will be appreciated that the exhaust gases and water are mixed in mixing chamber 4 in a manner that minimizes transfer of kinetic energy therebetween so that substantially all of this energy is employed in generating output thrust of our propulsor. Such output thrust is due mainly to the acceleration of the gas-water mixture caused by the expansion of the gas bubbles, entrained within the water as the mixture travels through and exhausts from nozzle 6. The size of the bubbles is predetermined and is preferably large to reduce the gas surface-to-volume ratio and thereby minimize heat transfer to conserve gas temperature. Converging nozzle 6 is a two-phase nozzle in that both the water and gas phases are employed in producing the output thrust of our propulsor. It is especially significant that by minimizing the loss of momentum in our propulsor the efficiency is kept at a significantly high value. Efficiency is usually designated as the ratio of gas horsepower input to the thrust velocity product output, or in other words, the thrust generated for the gas consumed by the propulsor. We generate an extremely high thrust for the exhaust gas consumed, by making use of high velocity two phase, water-gas, flow through exhaust nozzle 6. It is further emphasized that the graph of FIGURE 1 is significant in that output velocity (line 15) is substantially increased over input velocity (line 11), while our propulsor operates at the high efficiency discussed.

FIGURE 2 illustrates a cross-sectional view of an actual construction of a propulsor of our invention, the operation being the same as that of FIGURE 1. Water at ambient pressure and high velocity as indicated by arrows 8 enters diffuser inlet 2, substantially a diverging nozzle, and as it travels therethrough (arrows 22) its pressure is substantially increased, while its velocity decreased in the same manner as described with respect to FIGURE 1. High pressure exhaust gas enters the propulsor at 12 and as indicated by arrows 23 mixes with inlet water in mixing chamber 4 by passing through openings 5 therein. Chamber 4 is smooth-walled to the properly shaped and thereby avoid gas jetting within it. Openings 5 in mixing chamber 4 effectively cause gas that enters therein from gas inlet 12, to enter in the form of bubbles of a predesignated size, preferably large, which are significant to proper operation of our propulsor, as aforementioned. Subsequent to this mixing step, the two-phase gas-water mixture travels through converging nozzle 6 wherein the expanding gas accelerates the mixture to convert pressure head 13 of mixing chamber 4 to velocity head 15 so that significant thrust is produced by the propulsor. It will thus be appreciated that the high thrust, high efficiency operation described with respect to the schematic of FIGURE 1 is also, of course, achieved by the apparatus of FIGURE 2. Housing 24 surrounding the propulsor includes extending edges 26 and 28, the former containing part of inlet nozzle 2. Strut 30 contains the remainder of inlet nozzle 2. These particular features are for employing the propulsor to propel hydrofoil craft, as will subsequently be discussed. Many other configurations may be employed, some of which will be subsequently described, depending on the vehicle on which the propulsor is employed.

FIGURE 3 is a side view of the propulsor of FIGURE 2 adapted to be used for propulsion of hydrofoil ships. Water inlet 32 illustrates the large capacity of water that may be provided to the inlet of the propulsor to generate high thrusts.

Water inlet 46 (FIG. 4) may be made variable so that the thrust generated by the propulsor can be controlled by controlling the amount of water which enters the propulsor. Variable inlet 46 results in a variable diffusion ratio in diffuser 2 such that the pressure in mixing chamber 4 is always maintained at very nearly the pressure of the inlet gas.

FIGURE 4 illustrates the propulsor of our invention being employed for driving a hydrofoil ship. Propulsors 40 are combined with the structural elements of the hydrofoil ship, being contained within the respective struts thereof. Water intake 46 is located along the leading edge of hydrofoils 50, to eliminate the skin drag of a separate intake. The remainder of the intake nozzle is situated within strut 41 attached to the ship's hull. Hot exhaust gas is supplied by engine 42, mounted atop the ship, to propulsor 40 along dotted lines 44 for effective operation thereof. Propulsors 40 operate effectively when submerged to start the hydrofoil ship, so that the need for engines solely for starting is obviated, as is now required with the propulsion drives presently in use. As the hydrofoil ship gains speed, it gradually attains some lift and rises out of the water to be supported on struts 41 and hydrofoils 50. Propulsors 40 are then out of the water and thereby impart no extra drag force to the ship, a drag force normally associated with conventional underwater hydrofoil ship propulsion engines. Therefore, when the ship 48 becomes waterborne, (high speed operation) the drag is limited to the wave drag on struts 41 alone and is not influenced by the propulsors. Propulsors 40 also may be movable with respect to the direction of the ship to provide both steering and altitude control thereof. Control alternatively is obtained by secondary injection of gas or water, whichever is more convenient into propulsor exhaust nozzle 6 to deflect the exhaust stream laterally or vertically from its design position so as to modify its thrust vector and thereby attain steering and ship altitude during operation with relative ease. Relatively silent operation is obtained since the above water discharge results in a rain of droplets, which are indistinguishable from general sea noise, to thus avoid noise generally associated with propellors and other conventional ship drives. Therefore, by the employment of our propulsor with hydrofoil ships, operation from start-up through high speed travel is accomplished with the one drive, thereby avoiding the necessity of two separate drives, one for start-up and one for high speed operation. The three propulsors shown are by way of illustration only and are not to be construed as a limitation on our invention.

Figure 6:
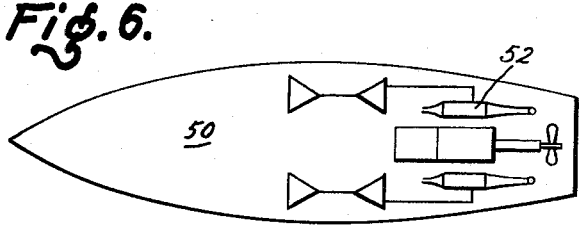
FIGURE 6 is a plan view of the ship of FIGURE 5.

In applications on shallow water craft, FIGURES 5 and 6, the propulsor intake 51 is located at the bottom of ship 50 and startup is therefore effected through pure jet engine thrust until sufficient water is lifted into the mixing chamber 52 to increase the mass flow substantially, at which time the engine exhaust is switched to mixing chamber 52 and the vehicle operates on the two-phase water-gas flow propulsor principle of our invention.

Figure 7:
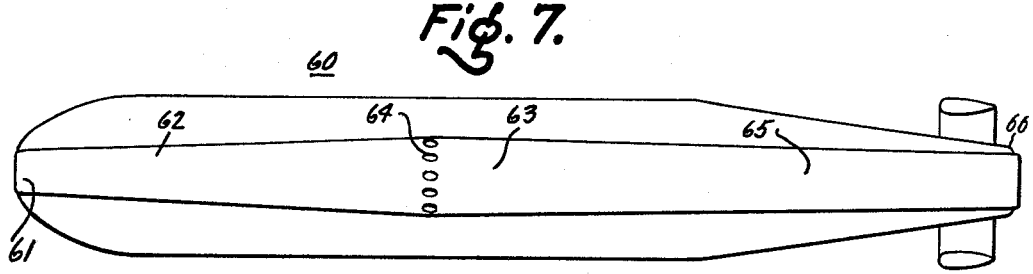
FIGURE 7 is a view of a underwater vehicle employing the propulsor of our invention.

FIGURE 7 illustrates the use of our propulsor as a drive for an underwater vehicle, such as a torpedo. The operation is the same as that of the previously described modes, water entering at stem inlet opening 61, being pressurized in inlet diffuser 62, and mixing in mixing chamber 63 with exhaust gas from a suitable high pressure noncondensible supply source which enters through openings 64. The two-phase gas-water mixture is ejected through converging nozzle 65 located in stern 66 to impart the requisite high thrust to torpedo 60. Nozzles 64 and 65 are of the same configuration and operation as the nozzles of FIGURE 1.

While exhaust nozzles in FIGURES 1–7 are shown as converging subsonic nozzles, when greater speeds are desired, they may, as shown in FIGURE 8, be constructed in a converging-diverging (supersonic) manner. Converging-diverging nozzles are most useful at speeds exceeding the velocity of sound, supersonic velocities, for the gas-water mixture (above 100 feet per second). Nozzle ratios may also be varied to accommodate the appropriate exhaust velocities in gas-to-liquid volume ratios at particular gas temperatures and pressures to achieve maximum efficiency of our propulsor. Also, a suitably shaped plug may be inserted into exhaust nozzle 6 and be made movable therein to adjust area ratios of exhaust nozzle 6 for optimum values of operation.

It will be appreciated that while the shape of our propulsor is shown as circular, it may be constructed in many other shapes, i.e., semicircular, such as by wrapping it around a ship's hull or rectangular, depending on the application desired.

During operation, highest efficiency is obtained when the velocity of the mixture exiting from nozzle 6 approaches the forward speed of the vehicle, as thereby the velocity of the exiting mixture is low relative to the velocity of the vehicle and energy loss is kept at a minimum.

It will be appreciated that because our propulsor has stationary, nonmoving parts, it is immune to the effects of cavitation which so seriously effect water propulsion drives having moving parts.

It is apparent from the foregoing that our invention attains the objectives set forth. Apparatus embodying our invention is sturdy in construction and well adapted for use in conjunction with various water environments. Propulsion is accomplished in a highly efficient manner without moving parts by effectively using a high pressure mixing of hot exhaust gas and cold water to obtain a significantly high thrust output.

While specific embodiments of our invention have been described, the invention is not limited thereto, since many modifications may be made by one skilled in the art, and the appended claims are intended to cover all such modifications as fall within the true spirit and scope of our invention.

What we claim as new and desire to secure by Letters Patent of the United States is:

1. A hydrofoil ship comprising
   a hull,
   an engine,
   a plurality of struts projecting from said hull,
   hydrofoils attached to said struts acting in combination therewith to support said hull during high speed operation,
   a propulsor adapted to propel the hydroplane comprising
   an inlet diffuser positioned in said hydrofoils and said struts for substantially increasing the pressure and decreasing the velocity of incoming water as it passes therethrough,
   means for supplying exhaust gas from said engine,
   a mixing chamber connected to at least one of said struts and to which the inlet diffuser and the gas supply means are connected to permit the high pressure, low velocity gas to mix with low velocity pressurized inlet water at low velocities so that there is a minimum of energy transfer therebetween so that this energy is available for thrust generation, and
   an outlet nozzle connected to said mixing chamber whereby the two-phase gas-water mixture existing in the mixing chamber in passing through the nozzle has its high pressure energy converted into high velocity to thereby impart substantial thrust from starting operation, while the hull is in water and said propulsor exhaust nozzle is submerged, through high speed operation, when the hull is out of water and supported on the hydrofoils and struts and said propulsor exhaust nozzle exhausts to the atmosphere.

2. A propulsor adapted to propel a water vehicle comprising means for lifting said vehicle hull out of the water,
   an inlet diffuser having an inlet located below the water line for substantially increasing the pressure of incoming water as it passes therethrough,
   a source of high pressure gas,
   means connected with said inlet diffuser at a point spaced from said inlet and with said source for mixing the high pressure gas and the pressurized water with a minimum of energy transfer therebetween so that substantially all of the energy of the high pressure gas water mixture is available for thrust generating, and
   an outlet nozzle connected with said mixing means so that the gas-water mixture in passing therethrough has its high pressure energy converted into high velocity to impart a substantial thrust to the vehicle being propelled, said nozzle being above the waterline at high speeds.

3. A propulsor having stationary parts adapted to propel a watercraft comprising means for lifting said watercraft hull out of the water,
   an inlet diffuser having an inlet located below the waterline for substantially increasing the pressure and decreasing the velocity of incoming water as it passes therethrough,
   a gas inlet adapted to supply hot high pressure, low velocity gas,
   a mixing chamber connected to said inlet diffuser and having a plurality of apertures at point spaced from said inlet connected to said gas inlet to permit high pressure, low velocity gas to enter said chamber in the form of bubbles, said high pressure gas bubbles being mixed with pressurized inlet water at low velocities so that there is a minimum of energy transfer therebetween to conserve substantially all of the energy of the mixture for thrust generation,
   an outlet nozzle connected to said mixing chamber on substantially the opposite side thereof from said diffuser wherein the two phase gas-water mixture existing in the mixing chamber has its high pressure converted to high velocity in passing through the nozzle to impart a substantial thrust to a watercraft, said nozzle being above the waterline at high speeds.

4. A propulsor having stationary parts adapted to propel a watercraft comprising means for raising said watercraft hull above the waterline as the watercraft attains speed,
   a waterinlet diffuser having an inlet located below the waterline and which tapers from a relatively small water entrance opening to a relatively larger terminal opening for substantially increasing the pressure and decreasing the velocity of incoming water as it passes therethrough,
   a gas inlet adapted to supply hot high pressure gas from a suitable gas supply means,
   a mixing chamber having a plurality of apertures therein at points spaced from said water inlet, positioned contiguous with said inlet diffuser to form a continuous connection therebetween, said chamber being partially surrounded by said gas inlet to permit high pressure exhaust gas to enter into said mixing chamber in the form of bubbles by passing through the apertures in said chamber, said high pressure gas bubbles being mixed with pressurized inlet water at low velocities whereby there is a minimum of energy transfer therebetween, so that substantially all of the energy of the high pressure gas-water mixture is available for generation of thrust, an outlet converging nozzle which tapers from a relatively large entrance opening contiguous with said mixing chamber to a relatively small exhaust opening, so that the two-phase gas-water mixture existing in the mixing chamber in passing through the nozzle has its high pressure energy converted into high velocity thereby to impart a substantial thrust force to a watercraft being propelled, said outlet converging nozzle being below the waterline at low speeds and above the waterline at high speeds.

5. A propulsor having stationary parts adapted to propel a watercraft comprising water supported means for raising the hull of said watercraft above the waterline at high speed, struts attached to said hull and attached to said supported means, an inlet diffuser having an inlet located below the waterline for substantially increasing the pressure and decreasing the velocity of incoming cold water as it passes therethrough the inlet of said diffuser being directed so that its opening is forward and located in said supported means, a gas inlet adapted to supply hot high pressure, low velocity gas, a mixing chamber having one end connected to said inlet diffuser and connected to said gas inlet through a plurality of apertures to permit high pressure, low velocity gas to enter said chamber in the form of bubbles, and wherein high pressure gas bubbles are mixed with pressurized inlet water at low velocities so that there is a minimum of energy transfer therebetween to conserve substantially all of the energy of the mixture for thrust generation, a two phase converging, diverging nozzle mounted on said strut and connected to said mixing chamber so that the high pressure of the two-phase gas-water mixture existing in the mixing chamber is converted to supersonic velocity in exiting from said nozzle to impart a substantial thrust to the watercraft.

6. A propulsor having stationary parts adapted to propel a hydrofoil craft from starting through high speed operation comprising a hydrofoil for raising a hydrofoil hull out of the water at high speed operation, a strut fastened to the top of said hydrofoil and adapted to be attached to said hydrofoil hull, an inlet diffuser having a water inlet located below the waterline for substantially increasing the pressure and decreasing the velocity of incoming cold water as it passes therethrough the inlets of said diffuser being located along the forward edge of said hydrofoil, a gas inlet adapted to supply hot high pressure, low velocity gas, a mixing chamber connected to said inlet diffuser and connected to said gas inlet through a plurality of apertures to permit high pressure, low velocity gas to enter said chamber in the form of bubbles, and wherein high pressure gas bubbles are mixed with pressurized inlet water at low velocities so that there is a minimum of energy transfer therebetween to conserve substantially all of the energy of the mixture for thrust generation, a two-phase nozzle pointing aft supported by said strut, and mounted on said strut at a height so that said nozzle is immersed in water at the starting speed and is above the waterline at high speed operation, said nozzle being further connected to said mixing chamber so that the high pressure of the two-phase gas water mixture existing in the mixing chamber is converted to supersonic velocity in exiting from said nozzle to impart a substantial thrust to the hydrofoil craft.

References Cited by the Examiner

UNITED STATES PATENTS 3,171,379 3/1965 Schell et al. _____ 114—66.5

MILTON BUCHLER, *Primary Examiner.*

D. P. NOON, A. H. FARRELL, *Assistant Examiners.*